(12) United States Patent
Bauer et al.

(10) Patent No.: US 9,988,031 B2
(45) Date of Patent: Jun. 5, 2018

(54) HYDRAULIC BRAKING SYSTEM AND METHOD

(71) Applicant: Robert Bosch GmbH, Stuttgart (DE)

(72) Inventors: Urs Bauer, Sachsenheim (DE); Michael Kunz, Steinheim an der Murr (DE); Ryan Kuhlman, Novi, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 14/932,649

(22) Filed: Nov. 4, 2015

(65) Prior Publication Data

US 2016/0152223 A1 Jun. 2, 2016

(30) Foreign Application Priority Data

Nov. 28, 2014 (DE) .......................... 10 2014 224 467

(51) Int. Cl.
| | |
|---|---|
| *B60T 13/68* | (2006.01) |
| *B60T 13/74* | (2006.01) |
| *B60T 7/04* | (2006.01) |
| *B60T 13/14* | (2006.01) |
| *B60T 13/66* | (2006.01) |
| *B60T 8/40* | (2006.01) |

(52) U.S. Cl.
CPC .......... *B60T 13/745* (2013.01); *B60T 7/042* (2013.01); *B60T 8/4081* (2013.01); *B60T 13/146* (2013.01); *B60T 13/662* (2013.01); *B60T 13/686* (2013.01)

(58) Field of Classification Search
CPC .......... B60T 7/042; B60T 7/12; B60T 8/4013; B60T 13/745; B60T 13/662; B60T 13/686; B60T 13/146
See application file for complete search history.

(56) References Cited

U.S. PATENT DOCUMENTS

| 5,496,099 A * | 3/1996 | Resch ................... B60T 7/042 303/113.4 |
| 9,399,452 B2 * | 7/2016 | Roll ....................... B60T 8/326 |
| 2002/0050739 A1 * | 5/2002 | Koepff .................. B60T 8/326 303/122.09 |
| 2011/0241417 A1 * | 10/2011 | Miyazaki ............... B60T 7/042 303/2 |

(Continued)

FOREIGN PATENT DOCUMENTS

DE 102 33 196 2/2003

*Primary Examiner* — Bradley T King
(74) *Attorney, Agent, or Firm* — Norton Rose Fulbright US LLP; Gerard Messina (57) ABSTRACT

A hydraulic braking system having: at least one wheel brake cylinder; a primary brake pressure generator that is disconnectably hydraulically coupled to the at least one wheel brake cylinder and is embodied to impinge upon the at least one wheel brake cylinder with pressure by way of a hydraulic fluid; a brake master cylinder that has at least one first pressure chamber and to which at least one wheel brake cylinder is hydraulically coupled; and a secondary brake pressure generator that is coupled to the first pressure chamber of the brake master cylinder and is embodied to impinge upon the first pressure chamber of the brake master cylinder with pressure, the secondary brake pressure generator being controllable independently of the primary brake pressure generator. Also disclosed is a related method.

15 Claims, 5 Drawing Sheets

(56) References Cited

U.S. PATENT DOCUMENTS

| | | | |
|---|---|---|---|
| 2013/0080016 A1* | 3/2013 | Bohn | B60T 7/042 701/78 |
| 2014/0110997 A1* | 4/2014 | Biller | B60T 8/4081 303/9.62 |
| 2016/0167632 A1* | 6/2016 | Deng | B60T 8/176 701/70 |
| 2016/0193990 A1* | 7/2016 | Drumm | B60T 7/042 701/70 |
| 2016/0200307 A1* | 7/2016 | Feigel | B60T 8/4081 303/6.01 |

* cited by examiner

HYDRAULIC BRAKING SYSTEM AND METHOD

RELATED APPLICATION INFORMATION

The present application claims priority to and the benefit of German patent application No. 10 2014 224 467.6, which was filed in Germany on Nov. 28, 2014, the disclosure of which is incorporated herein by reference.

FIELD OF THE INVENTION

The present invention relates to a hydraulic braking system and to a method for operating a hydraulic braking system.

BACKGROUND INFORMATION

In modern vehicles, a plurality of driver assistance systems assist the driver with driving the vehicle. Systems that take over acceleration and braking, as well as steering of the vehicle, from the driver in various situations are increasingly being used in passenger cars. When control of the vehicle is entirely taken over from the driver, the term "highly automated driving" or "autonomous driving" is also used.

In highly automated driving, the driver can engage in activities other than controlling the vehicle while traveling. The driver therefore cannot monitor the movement and surroundings of the vehicle. The result is that in some circumstances the driver cannot be called upon in the event of a required braking operation. Stringent demands in terms of availability are therefore placed on the braking system of such a vehicle.

Patent document DE 102 33 196 discusses a braking system that encompasses a hydraulically actuatable brake cylinder for actuating a brake. The system furthermore encompasses a pressure control cylinder with which a pressure in wheel brakes can be established. The pressure control cylinder can be acted upon by way of an electronic adjusting apparatus. In the event of failure of the pressure control cylinder, an assistance force can no longer be made available on the part of an assistance system. Such a failure can be, for example, a failure of the engine, with the result that a pressure increase by way of an assistance force is no longer possible, but instead can be provided only by the driver using muscle power.

SUMMARY OF THE INVENTION

The present invention is to a hydraulic braking system having the features described herein and a method having the features described herein.

The following is provided in accordance therewith:

A hydraulic braking system having: at least one wheel brake cylinder; a primary brake pressure generator that is disconnectably hydraulically coupled to the at least one wheel brake cylinder and is embodied to impinge upon the at least one wheel brake cylinder with pressure by way of a hydraulic fluid; a brake master cylinder that has at least one first pressure chamber and to which at least one wheel brake cylinder is hydraulically coupled; and having a secondary brake pressure generator that is coupled to the first pressure chamber of the brake master cylinder and is embodied to impinge upon the first pressure chamber of the brake master cylinder with pressure, the secondary brake pressure generator being controllable independently of the primary brake pressure generator.

The following is furthermore provided:

A method for operating a hydraulic braking system as recited in one of the preceding claims, comprising: furnishing a fault signal that indicates a fault of the primary brake pressure generator; hydraulically disconnecting the primary brake pressure generator from the at least one wheel brake cylinder in reaction to the fault signal; and generating in controlled fashion a predefined pressure in the at least one wheel brake cylinder by way of the secondary brake pressure generator, in reaction to the fault signal.

The realization on which the present invention is based is that because of increasing integration, modern braking systems have only one primary pressure generator, and availability for highly automated driving can therefore be too low.

The idea on which the present invention is based is thus to implement this realization and to provide a capability for generating pressure, in a highly integrated braking system, with a secondary pressure generator, so that a braking function can be furnished independently of a driver of the vehicle if the primary pressure generator is not available.

The present invention provides, for this purpose, that a secondary pressure generator independent of the primary pressure generator is provided in the braking system, and is embodied only to impinge upon the first pressure chamber of a brake master cylinder of the braking system with pressure.

In conventional braking systems, the first pressure chamber of the brake master cylinder is usually coupled to at least one of the wheel brake cylinders. If a second pressure chamber, for example, is provided in the brake master cylinder, said chamber is usually coupled to a further one of the wheel brake cylinders. In an embodiment of this kind having two pressure chambers, the pressure in the brake master cylinder in the first pressure chamber is also transferred into the second pressure chamber, the result being that a dual-circuit braking system can be furnished using a single brake master cylinder.

With the aid of the second pressure generator of the present invention, pressure can be built up in the first pressure chamber of the brake master cylinder independently of a brake actuation by the driver or by the primary pressure generator. Pressure is thus built up simultaneously in those wheel brake cylinders which are coupled to the first pressure chamber.

Because, in a brake master cylinder having a second pressure chamber, the pressure in the first pressure chamber is also transferred to the second pressure chamber by way of a float piston in the brake master cylinder, pressure is also built up in those wheel brake cylinders which are coupled to the second pressure chamber.

The present invention consequently makes it possible to furnish a high-availability braking system even if the driver cannot be used as fallback upon a failure of the primary pressure generator.

Advantageous embodiments and refinements are evident from the dependent claims and from the description with reference to the Figures.

In an embodiment, the hydraulic braking system has a hydraulic fluid reservoir that is hydraulically coupled via a first hydraulic connection to the first pressure chamber of the brake master cylinder, and/or that is hydraulically coupled to an input of the second brake pressure generator. This allows the brake master cylinder to be supplied with hydraulic fluid in simple fashion.

In an embodiment, an output of the secondary brake pressure generator is hydraulically coupled to the first hydraulic connection. In this embodiment the pressure that is built up by the secondary pressure generator is introduced into the braking system between the hydraulic fluid reservoir and the brake master cylinder. The result is that during normal operation of the braking system, the second pressure generator is not impinged upon by the operating pressure of the braking system.

In an embodiment, the output of the secondary brake pressure generator is coupled to a second hydraulic connection that couples the first pressure chamber of the brake master cylinder to at least one of the wheel brake cylinders. In this embodiment the pressure that is built up by the secondary pressure generator is introduced into the braking system between the brake master cylinder and the wheel brake cylinders coupled to the first pressure chamber of the brake master cylinder. This makes it possible to displace volume actively into the braking system even when the driver has already actuated the brake pedal and, for example, the breather orifice of the first pressure chamber of the brake master cylinder is already blocked. This configuration further makes it possible to continue to displace volume into the brake circuits even in an already braked state, and thereby to build up a large braking force even in vehicles having a large volume capacity in the wheel brake cylinders.

In an embodiment, the hydraulic braking system has a first interrupting arrangement that is disposed in the first hydraulic connection and is embodied to control a flow of hydraulic fluid into the hydraulic fluid reservoir. With the aid of the interrupting arrangement, which can be embodied e.g. as a valve, it is possible to prevent the pressure generated by the secondary pressure generator from being discharged into the reservoir.

In an embodiment, the hydraulic braking system has a primary calculating device that is embodied to apply control to the primary brake pressure generator. The hydraulic braking system furthermore has a secondary calculating device that is embodied to apply control to the secondary brake pressure generator, in particular to a motor of the secondary brake pressure generator, in particular in the event of a fault in the primary brake pressure generator. When two independent calculating devices are provided, it then continues to be possible to apply control to the secondary pressure generator, and to build up pressure, even in the event of a failure of the primary calculating device.

In an embodiment, the secondary calculating device is coupled to the first interrupting arrangement and is embodied to apply control to the first interrupting arrangement. When control is applied both to the secondary pressure generator and to the first interrupting arrangement by the secondary calculating device, this simplifies control of the braking system in the event of a fault in the primary pressure generator.

In an embodiment, the primary calculating device and the second calculating device are disposed in different control units. This increases the availability of the primary calculating device and of the secondary calculating device, since a fault in one individual control unit does not result in a failure of both calculating devices.

In an embodiment, the primary calculating device and the secondary calculating device each have a separate energy supply system. This further increases the availability of the primary calculating device and of the secondary calculating device, since an individual fault in one energy supply system does not result in a failure of both calculating devices.

In an embodiment, the secondary brake pressure generator has a single-circuit pump, in particular a single-piston pump. This makes it possible to furnish an uncomplicated secondary brake pressure generator to which control can be applied in simple fashion.

In an embodiment, the secondary brake pressure generator is embodied to generate a maximum brake pressure that corresponds at least to the maximum operating brake pressure of the hydraulic braking system, in particular 100 bar to 200 bar. The entire operating brake pressure range of the braking system can thus also be serviced by the secondary brake pressure generator.

In an embodiment, the method encompasses cyclically applying control to the first interrupting arrangement at a predefined frequency, upon generation of the predefined pressure by way of the secondary brake pressure generator, so that a flow of hydraulic fluid into the hydraulic fluid reservoir cyclically takes place and is interrupted. Even in the context of a fault in the primary pressure generator or in a control unit of the primary pressure generator that correspondingly controls valves in the braking system, for example in the implementation of an ABS function, it is thus nevertheless possible to cyclically build up and release a pressure in the brake circuits and to continue to furnish an antilock braking system (ABS) function.

The above embodiments and refinements can be combined arbitrarily with one another if appropriate. Further possible embodiments, refinements, and implementations of the invention also encompass combinations, not explicitly recited, of features of the invention that are described above or below with reference to the exemplifying embodiments. In particular, one skilled in the art will also add individual aspects as improvements or supplements to the respective basic form of the present invention.

The present invention will be explained in more detail below with reference to the exemplifying embodiments described in the schematic Figures of the drawings.

In all the Figures, identical or identically functioning elements and apparatuses have been labeled, unless otherwise indicated, with the same reference characters.

DETAILED DESCRIPTION

Figure 1:
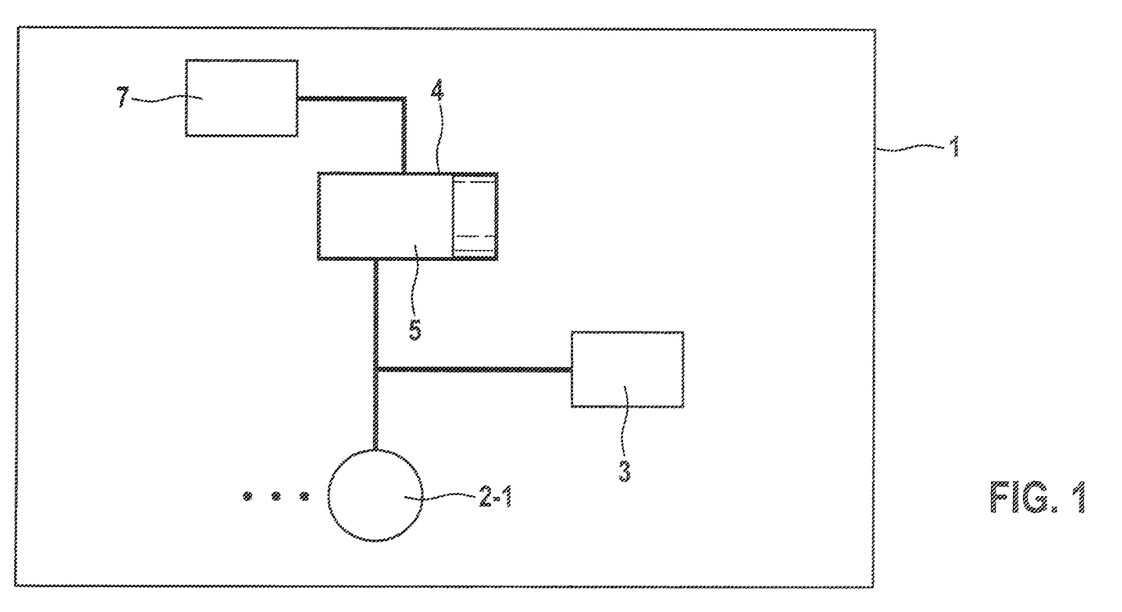
FIG. 1 is a block diagram of an embodiment of the hydraulic braking system according to the present invention.

FIG. 1 is a block diagram of an embodiment of hydraulic braking system 1 according to the present invention.

Hydraulic braking system 1 has a wheel brake cylinder 2-1 that is hydraulically coupled to a primary brake pressure generator 3 and to a brake master cylinder 4. Further wheel brake cylinders are indicated by three dots.

Wheel brake cylinder 2-1 can be impinged upon by pressure, by way of a hydraulic fluid, via both primary pressure generator 3 and brake master cylinder 4.

Wheel brake cylinder 2-1 is coupled for that purpose to a first pressure chamber 5 of brake master cylinder 4. In further embodiments, brake master cylinder 4 can additionally have a second pressure chamber 6 that can be hydraulically coupled, for example, to further wheel brake cylinders. An embodiment of this kind is shown, for example, in FIGS. 2 to 4.

Lastly, hydraulic braking system 1 has a secondary brake pressure generator 7 that is hydraulically coupled to first pressure chamber 5 of brake master cylinder 4. Brake pressure generator 7 can thereby impinge upon first pressure chamber 5 of brake master cylinder 4 with pressure, for example likewise by way of the hydraulic fluid.

According to the present invention, secondary brake pressure generator 7 can have control applied to it independently of primary brake pressure generator 3. In an embodiment, separate control application can be furnished, for example, by way of two separate control units, each one of which applies control to one of brake pressure generators 3, 7. In a further embodiment, separate energy sources can furthermore be furnished for primary brake pressure generator 3 and for secondary brake pressure generator 7.

In an embodiment, both primary brake pressure generator 3 and secondary brake pressure generator 7 can have pumps, in particular pumps having an electric motor as a drive system. In an embodiment, the pump of secondary brake pressure generator 7 can be, for example, a particularly simple single-piston pump.

In an embodiment, secondary brake pressure generator 7 can be configured to generate a maximum pressure that corresponds to the maximum brake pressure required in hydraulic braking system 1. Second brake pressure generator 7 is consequently configured to cover or service the entire operating pressure range of hydraulic braking system 1. In an embodiment, the maximum pressure that can be generated by secondary brake pressure generator 7 can be, for example, over 100 bar, in particular between 100 bar and 200 bar.

In FIG. 1, secondary brake pressure generator 7 and wheel brake cylinder 2-1 are each coupled to brake master cylinder 4 via separate connections. This configuration is merely exemplifying, and in further embodiments can deviate from what is depicted in FIG. 1.

Figure 2:
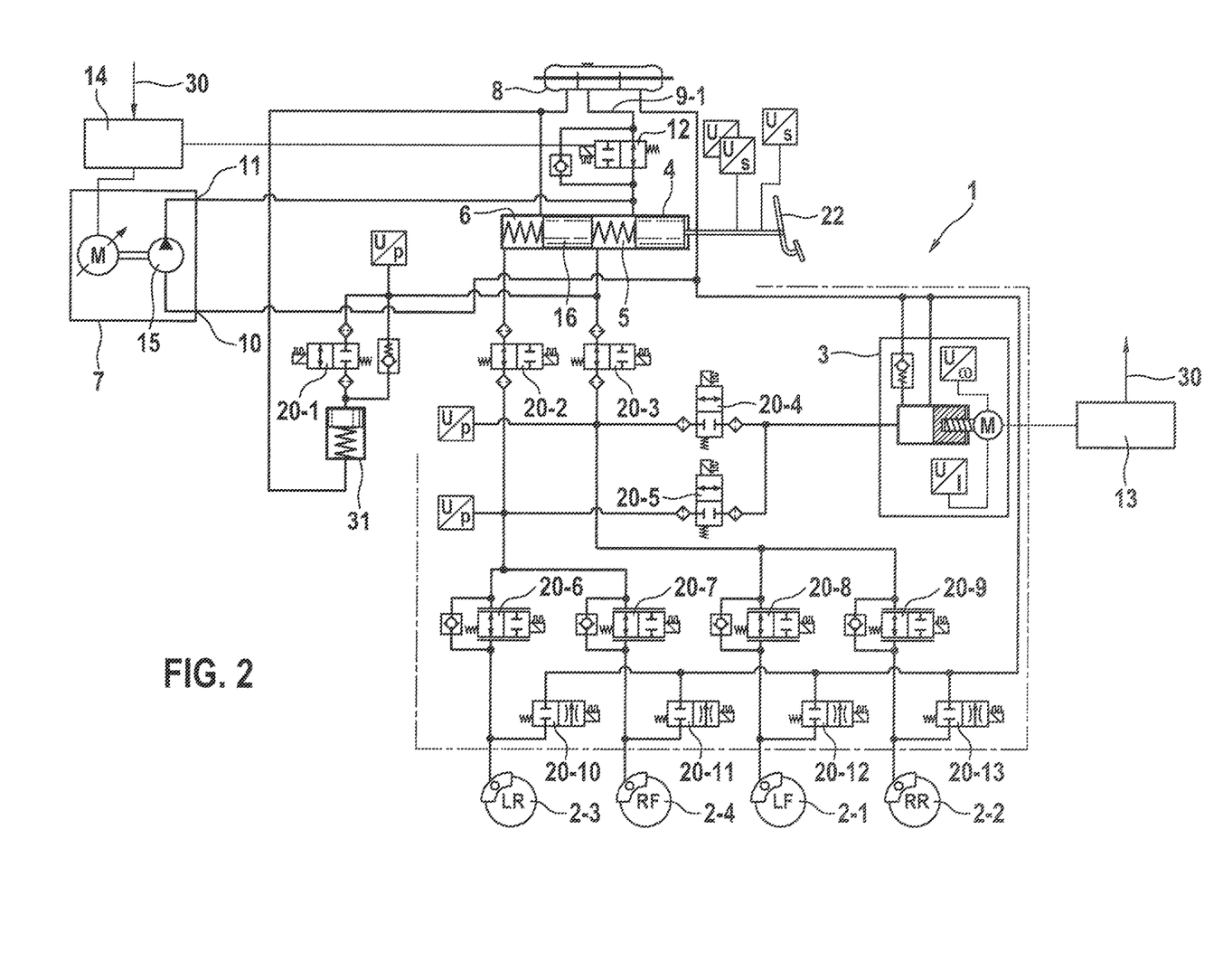
FIG. 2 is a block diagram of a further embodiment of the hydraulic braking system according to the present invention.

FIG. 2 is a block diagram of a further embodiment of hydraulic braking system 1 according to the present invention.

Hydraulic braking system 1 of FIG. 2 is based on the hydraulic braking system of FIG. 1, and has a plurality of further components.

Brake master cylinder 4 of FIG. 2 additionally has a second pressure chamber 6. The result is that in brake master cylinder 4, the pressure that is present in first pressure chamber 5 becomes transferred into second pressure chamber 6 via a float piston 16 of brake master cylinder 4. Pressure can thus also be generated indirectly in second pressure chamber 6 via secondary brake pressure generator 7.

A hydraulic fluid reservoir 8 that has a hydraulic fluid is provided in FIG. 2. Hydraulic fluid reservoir 8 is coupled to an input of first pressure chamber 5 and to an input of second pressure chamber 6 of brake master cylinder 4. For example, hydraulic fluid reservoir 8 can be respectively coupled to the breather orifice of the respective pressure chamber 5, 6. Hydraulic fluid reservoir 8 is furthermore coupled to a primary pressure generator 3 that has a motor coupled to a pump, as well as a check valve.

An output of first pressure chamber 5 of brake master cylinder 4 is coupled to two wheel brake cylinders 2-1 and 2-2. For example, wheel brake cylinder 2-1 can be disposed on a left front wheel of a vehicle, and wheel brake cylinder 2-2 can be disposed on a right rear wheel of a vehicle.

An output of second pressure chamber 6 of brake master cylinder 4 is coupled to two wheel brake cylinders 2-3 and 2-4. For example, wheel brake cylinder 2-3 can be disposed on a left rear wheel of a vehicle, and wheel brake cylinder 2-4 can be disposed on a right front wheel of a vehicle.

An interrupting arrangement 12, which is embodied e.g. as a valve, in particular as a controllable valve, is disposed between hydraulic fluid reservoir 8 and the input of first pressure chamber 5.

Also coupled to brake master cylinder 4 is a pedal 22 with which, for example, the driver of a vehicle can control braking system 1.

A plurality of valves 20-1 to 20-13 are disposed in the connections between the individual components of hydraulic braking system 1.

A valve 20-1 is disposed between the output of first pressure chamber 5 and a brake pedal simulator. A valve 20-2 is furthermore disposed between the output of second pressure chamber 6 and the two wheel brake cylinders 2-3, 2-4. A valve 20-4 is disposed between first pressure chamber 5 and wheel brake cylinders 2-1, 2-2. A respective valve 20-4, 20-5 is furthermore disposed between primary pressure generator 3 and one of the connections between pressure chambers 5, 6 and valves 20-2, 20-3.

Lastly, a respective inlet valve 20-6 to 20-9 is disposed between each of pressure chambers 5 and 6 and the individual wheel brake cylinders 2-1 to 2-4. A respective outlet valve is disposed between wheel brake cylinders 2-1 to 2-4 and hydraulic fluid reservoir 8.

During normal operation of the braking system, i.e. when primary pressure generator 3 is fully functional, valves 20-1 to 20-13 serve to implement functions such as normal boosted braking, ESP, and ABS. Also present in FIG. 2 are a plurality of pressure transducers for electronically sensing pressure in braking system 1, which for reasons of clarity have not been labeled with their own reference characters.

In FIG. 2, secondary pressure generator 7, which has a motor and a pump 15 driven by the motor, is coupled to the braking system in such a way that input 10 of pump 15 is coupled to hydraulic fluid reservoir 18 via the line by way of which primary pressure generator 3 is also coupled to hydraulic fluid reservoir 8.

In further embodiments, however, input 10 of pump 15 can also be coupled to hydraulic fluid reservoir 8 in any other manner, e.g. including directly via a separate line.

Output 11 of pump 15 is coupled to the line that couples interrupting arrangement 12 to the input of first pressure chamber 5.

Lastly, FIG. 2 depicts a primary calculating device 13 and a secondary calculating device 14.

Primary calculating device 13 is coupled to primary pressure generator 3 in order to control the latter. Primary calculating device 13 can, for that purpose, have or apply control to components such as power output stages that apply control to the motor of primary pressure generator 3. Primary calculating device 13 can furthermore read out, for example, the pressure transducers and further sensors present in braking system 1 in order to apply control to the primary pressure generator and to valves 20-1 to 20-13.

Primary calculating device 13 of FIG. 2 is furthermore embodied to output a fault signal 30 when a fault that influences the normal operation of braking system 1 occurs in primary pressure generator 3 or in primary calculating device 13.

Fault signal 30 can be received, inter alia, by secondary calculating device 14. Secondary calculating device 14 can thereupon apply control to interrupting arrangement 12 and to secondary pressure generator 7 so that the functionality of hydraulic braking system 1 can be maintained even in the context of a fault in primary pressure generator 3. Second calculating device 14 can also receive, besides the fault signal, further control signals from higher-order vehicle systems that stipulate to secondary calculating device 14 the braking function that is desired.

If secondary calculating device 14 is intended to build up pressure in wheel brake cylinders 2-1 to 2-4, it closes interrupting arrangement 12 and, via pump 15, builds up pressure in first pressure chamber 5 of the brake master cylinder.

This pressure becomes transferred into second pressure chamber 6 and, via both pressure chambers 5, 6, to wheel brake cylinders 2-1 to 2-4. In such a case, primary pressure generator 3 can be decoupled from wheel brake cylinders 2-1 to 2-4 via valves 20-4 and 20-5 in order to prevent any influence.

Secondary calculating device 14 can also, for example, implement an ABS functionality by cyclically applying control to interrupting arrangement 12.

In the embodiment shown in FIG. 2, in normal operation, i.e. when primary pressure generator 3 is fully functional, secondary pressure generator 7 is not impinged upon by the pressure that is built up in the brake circuits of braking system 1 by primary pressure generator 3.

In further embodiments, primary calculating device 13 does not itself generate fault signal 30. For example, a monitoring device can be provided which monitors primary calculating device 13 and primary pressure generator 3. The functionality of primary calculating device 13 and of primary pressure generator 3 can, for example, be cyclically polled or monitored.

Fault signal 30 can be transferred to secondary calculating device 14, for example, via a bus system of a vehicle or via discrete lines.

In an embodiment, calculating devices 13, 14 can be disposed in a vehicle as independent control units. Alternatively, calculating devices 13, 14 can also be disposed as components (hardware or software) in one or more control units already present in the vehicle.

Figure 3:
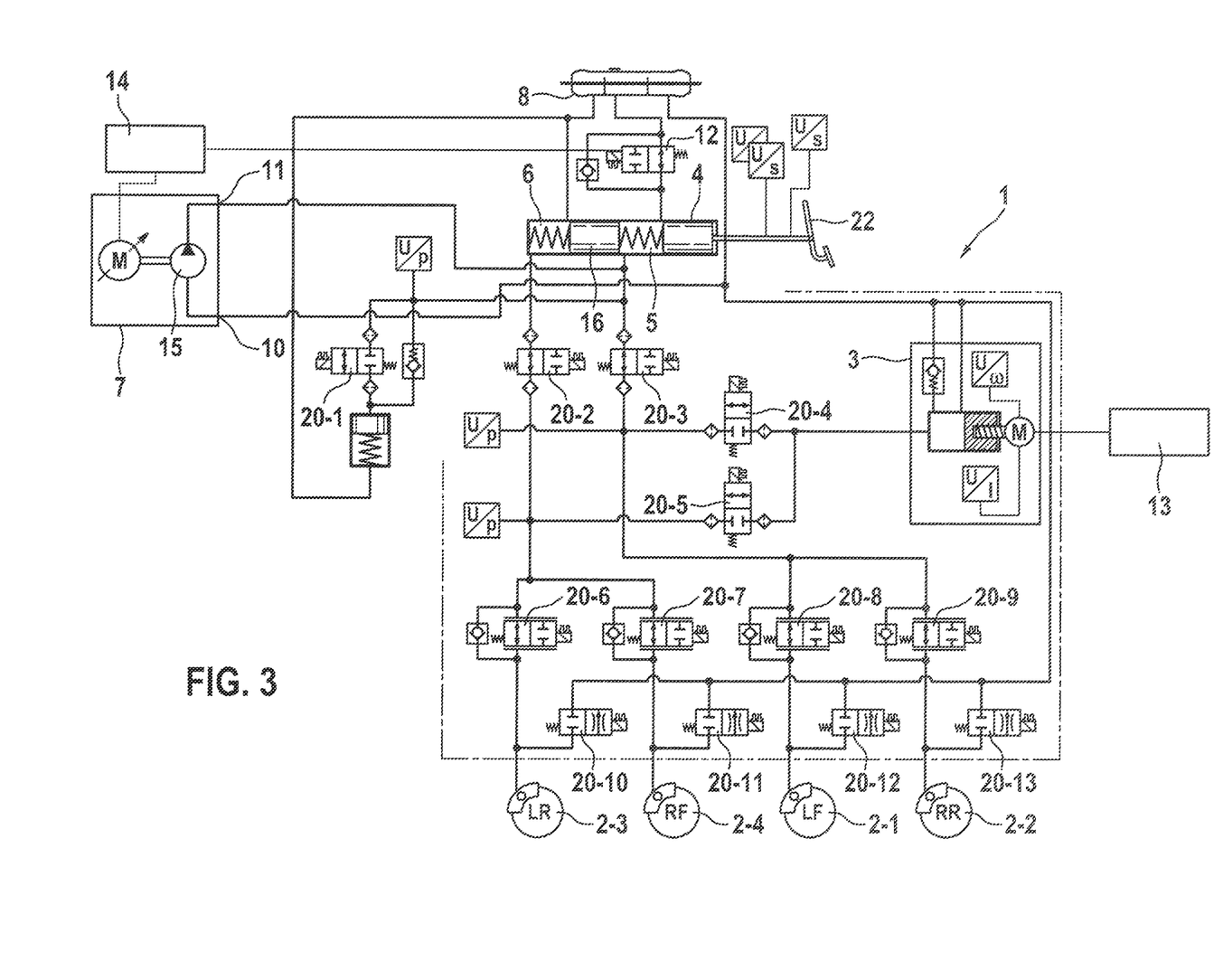
FIG. 3 is a block diagram of a further embodiment of the hydraulic braking system according to the present invention.

FIG. 3 is a block diagram of a further embodiment of hydraulic braking system 1 according to the present invention.

Hydraulic braking system 1 of FIG. 3 is based on hydraulic braking system 1 of FIG. 2 and differs therefrom in that output 11 of pump 15 of secondary pressure generator 7 is coupled to the output of first pressure chamber 5 of brake master cylinder 4. The connection takes place between valve 20-3 and the output of first pressure chamber 5.

When brake pedal 22 is depressed by the driver of the vehicle, the breather orifice of first pressure chamber 5 of brake master cylinder 4 is closed off and pressure can no longer be introduced into first pressure chamber 5 at the input of first pressure chamber 5.

The configuration shown in FIG. 3 allows pressure to be introduced with secondary pressure generator 7 into the brake circuits, or into first pressure chamber 5, even if a brake pedal 22 has already been actuated by the driver.

The embodiment of FIG. 3 can furthermore also be used in normal operation, i.e. when primary pressure generator 3 is not exhibiting any malfunction, in order to introduce further volume into wheel brake cylinders 2-1 to 2-4 or to build up a higher pressure in wheel brake cylinders 2-1 to 2-4.

Braking performance can thereby be enhanced, especially in vehicles that have a high volume capacity in wheel brake cylinders 2-1 to 2-4.

Figure 4:
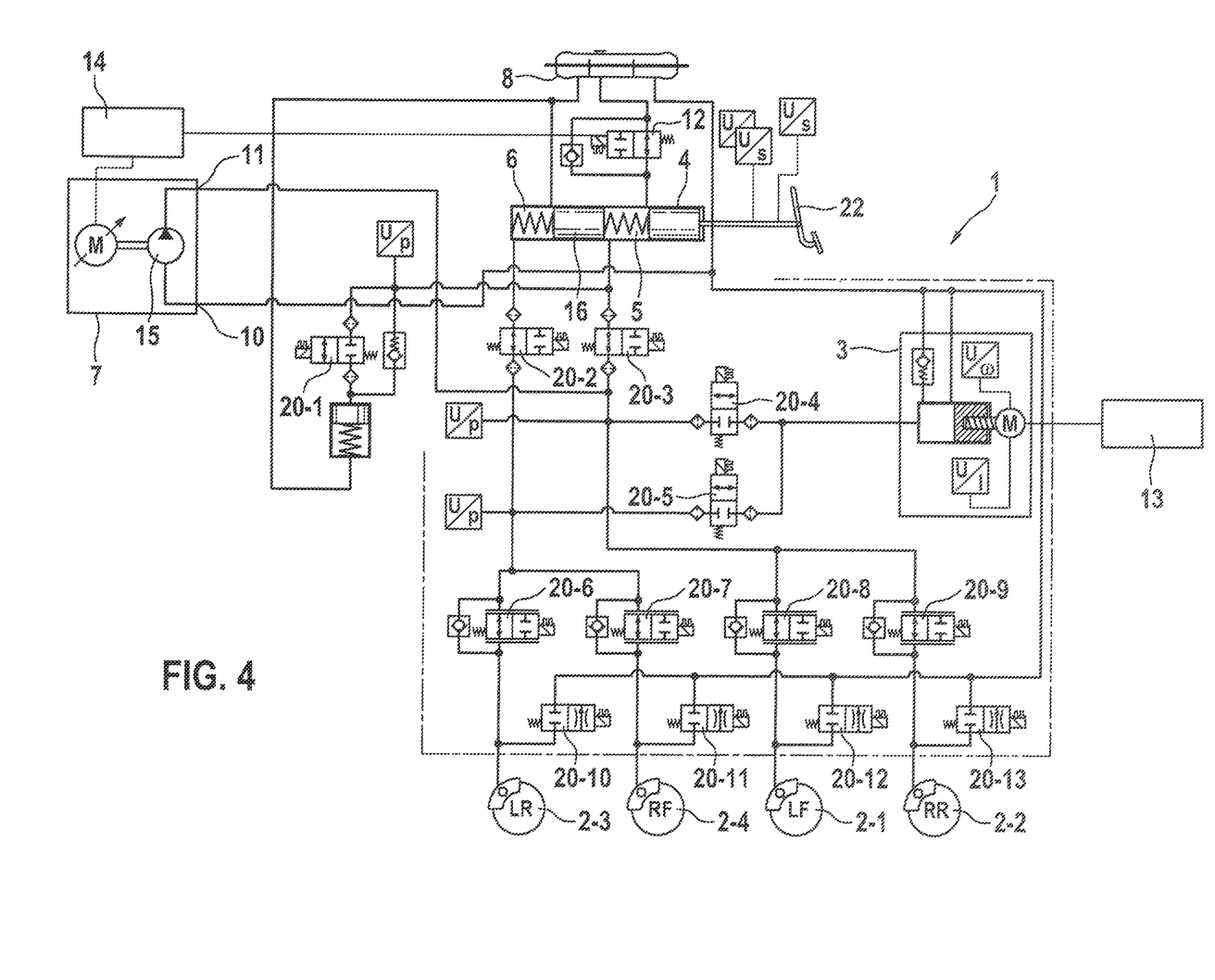
FIG. 4 is a block diagram of a further embodiment of the hydraulic braking system according to the present invention.

FIG. 4 is a block diagram of a further embodiment of hydraulic braking system 1 according to the present invention.

Hydraulic braking system 1 of FIG. 4 is based on hydraulic braking system 1 of FIG. 3, and differs therefrom in that output 11 of pump 15 of secondary pressure generator 7 is coupled to the output of first pressure chamber 5 of brake master cylinder 4 not directly, but instead after valve 20-3. The connection thus takes place between valve 20-3 and wheel brake cylinders 2-1, 2-2.

The embodiment of FIG. 4 makes it possible to convey volume or hydraulic fluid into the corresponding brake circuit with braking system 1 in an active operating mode in which valve 20-3 is closed. In such an operating mode, valves 20-4, 20-5 can be opened and thus, in the context of a dual-circuit system, volume or hydraulic fluid can also be conveyed into the second brake circuit. All the wheel brake cylinders 2-1 to 2-4 can thus be impinged upon by hydraulic fluid or pressure.

This makes it possible for volume to be introduced into braking system 1 by way of secondary pressure generator 7 even during active operation. In addition, the pressure buildup dynamics during active operation of braking system 1 can be improved, since a displaced plunger volume of braking system 1 and the delivered volume of secondary pressure generator 7 are added.

FIGS. 2 to 4 each show dual-circuit braking systems 1. It is apparent from FIGS. 2 to 4, however, that secondary pressure generator 7 is always directly hydraulically connected to the first brake circuit. In further embodiments, the present invention can therefore also be embodied as a single-circuit braking system 1 having only one brake circuit.

Figure 5:
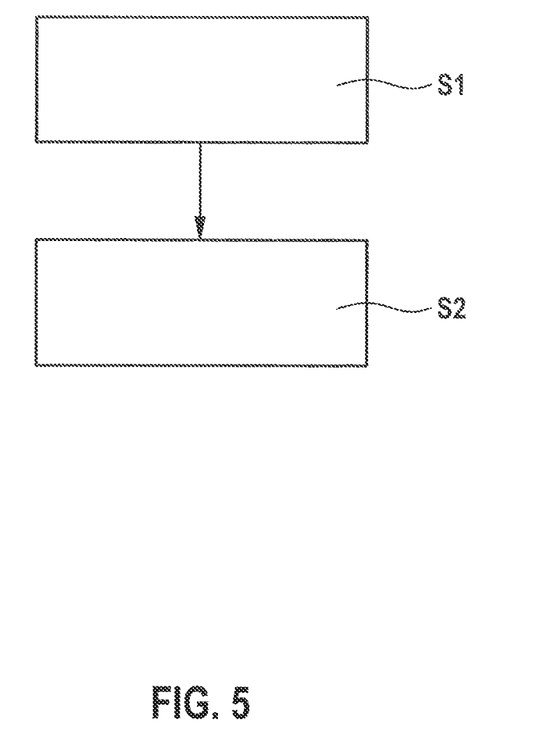
FIG. 5 is a flow chart of an embodiment of the method according to the present invention.

FIG. 5 is a flow chart of an embodiment of the method according to the present invention for operating a hydraulic braking system 1 according to the present invention.

The method provides for furnishing (S1) a fault signal 30 if a fault exists in primary pressure generator 3. The fault can be a mechanical, electrical, or any other fault that prevents pressure from being built up in hydraulic braking system 1, by primary brake pressure generator 3, in wheel brake cylinders 2-1 to 2-4.

Lastly, in reaction to the furnishing (S1) of fault signal 30, a predefined pressure is built up (S2) in the at least one wheel brake cylinder 2-1 to 2-4 by way of secondary brake pressure generator 7.

In an embodiment, when fault signal 30 is furnished, primary brake pressure generator 3 is hydraulically disconnected from the at least one wheel brake cylinder 2-1 to 2-4. This can be accomplished, for example, by a suitable disposition of and application of control to valves 20-1 to 20-13.

In an embodiment, upon generation of the predefined pressure by way of secondary pressure generator 7, a first interrupting arrangement 12 can have control applied to it so that a flow of hydraulic fluid into a hydraulic fluid reservoir 8 of the hydraulic braking system is prevented. This enables an effective pressure buildup in wheel brake cylinders 2-1 to 2-4.

In addition to simply a pressure buildup, a cyclic buildup of pressure can also be provided for; provision can be made for this purpose, in an embodiment, to cyclically apply control at a predefined frequency to first interrupting arrangement 12 upon generation of the predefined pressure by way of secondary brake pressure generator 7, so that a flow of hydraulic fluid into hydraulic fluid reservoir 8 cyclically takes place and is interrupted. A form of antilock braking, also called ABS, can thus be furnished even in the event of a fault in primary brake pressure generator 3.

Although the present invention has been described above on the basis of exemplifying embodiments, it is not limited thereto but instead is modifiable in numerous ways. In particular, the invention can be changed or modified in a multiplicity of ways without deviating from the essence of the invention.

What is claimed is:

1. A hydraulic braking system, comprising:
    at least one wheel brake cylinder;
    a primary brake pressure generator disconnectably hydraulically coupled to the at least one wheel brake cylinder and that impinges upon the at least one wheel brake cylinder with pressure by a hydraulic fluid;
    a brake master cylinder having at least one first pressure chamber and to which at least one wheel brake cylinder is hydraulically coupled;
    a secondary brake pressure generator having an output that is hydraulically coupled to an input of the first pressure chamber and that impinges upon the first pressure chamber of the brake master cylinder with pressure, wherein the secondary brake pressure generator is controllable independently of the primary brake pressure generator; and
    a hydraulic fluid reservoir hydraulically coupled via a first hydraulic connection to the first pressure chamber of the brake master cylinder, and coupled via a second hydraulic connection to an input of the secondary brake pressure generator,
    wherein the second hydraulic connection includes a line directly connecting the hydraulic fluid reservoir to the primary brake pressure generator.

2. The hydraulic braking system of claim 1, further comprising:
    a first interrupting arrangement disposed in the first hydraulic connection and configured to control a flow of hydraulic fluid into the hydraulic fluid reservoir.

3. The hydraulic braking system of claim 2, further comprising:
    a primary calculating device to apply control to the primary brake pressure generator; and
    a secondary calculating device to apply control to the secondary brake pressure generator.

4. The hydraulic braking system of claim 3, wherein the secondary calculating device is coupled to the first interrupting arrangement and is configured to apply control to the first interrupting arrangement.

5. The hydraulic braking system of claim 3, wherein the primary calculating device and the second calculating device are disposed in different control units.

6. The hydraulic braking system of claim 3, wherein the primary calculating device and the secondary calculating device each include a separate energy supply system.

7. The hydraulic braking system of claim 1, wherein at least one of the following is satisfied: (i) the secondary brake pressure generator includes a single-circuit pump, and (ii) the secondary brake pressure generator is configured to generate a brake pressure sufficient to service an entire operating pressure range of the hydraulic braking system.

8. The hydraulic braking system of claim 1, further comprising:
    a primary calculating device to apply control to the primary brake pressure generator; and
    a secondary calculating device to apply control to the secondary brake pressure generator.

9. The hydraulic braking system of claim 1, wherein at least one of the following is satisfied: (i) the secondary brake pressure generator includes a single-circuit pump, in particular a single-piston pump, and (ii) the secondary brake pressure generator is configured to generate a brake pressure sufficient to service an entire operating pressure range of the hydraulic braking system.

10. The hydraulic braking system of claim 8, wherein the control to the secondary brake pressure generator is applied to a motor of the secondary brake pressure generator in the event of a fault in the primary brake pressure generator.

11. The hydraulic braking system of claim 9, wherein the brake pressure is more than 100 bar.

12. The hydraulic braking system of claim 1, wherein the secondary brake pressure generator impinges upon the first pressure chamber of the brake master cylinder with pressure when the primary brake pressure generator is inactive and independently of a driver braking actuation.

13. A method for operating a hydraulic braking system, the method comprising:
    furnishing a fault signal that indicates a fault of a primary brake pressure generator; and
    generating a predefined pressure in at least one wheel brake cylinder by a secondary brake pressure generator, in reaction to a fault signal;
    wherein the hydraulic braking system includes:
        the at least one wheel brake cylinder;
        the primary brake pressure generator, which is disconnectably hydraulically coupled to the at least one wheel brake cylinder and impinges upon the at least one wheel brake cylinder with pressure by a hydraulic fluid;
        a brake master cylinder having at least one first pressure chamber and to which at least one wheel brake cylinder is hydraulically coupled;
        the secondary brake pressure generator having an output that is hydraulically coupled to an input of the first pressure chamber of the brake master cylinder and that impinges upon the first pressure chamber of the brake master cylinder with pressure, wherein the secondary brake pressure generator is controllable independently of the primary brake pressure generator; and
        a hydraulic fluid reservoir hydraulically coupled via a first hydraulic connection to the first pressure chamber of the brake master cylinder, and coupled via a second hydraulic connection to an input of the secondary brake pressure generator,
        wherein the second hydraulic connection includes a line directly connecting the hydraulic fluid reservoir to the primary brake pressure generator.

14. The method of claim 13, further comprising:
    applying control to a first interrupting arrangement, upon generation of the predefined pressure by the secondary pressure generator, so that a flow of hydraulic fluid into the hydraulic fluid reservoir is prevented.

15. The method of claim 13, further comprising:
    cyclically applying control to a first interrupting arrangement at a predefined frequency, upon generation of the predefined pressure by way of the secondary brake pressure generator, so that a flow of hydraulic fluid into the hydraulic fluid reservoir cyclically takes place and is interrupted.

* * * * *